Oct. 27, 1970  B. R. FICK  3,535,711
CUTANEOUS STIMULI SENSOR AND TRANSMISSION NETWORK
Filed Nov. 1, 1967  3 Sheets-Sheet 3

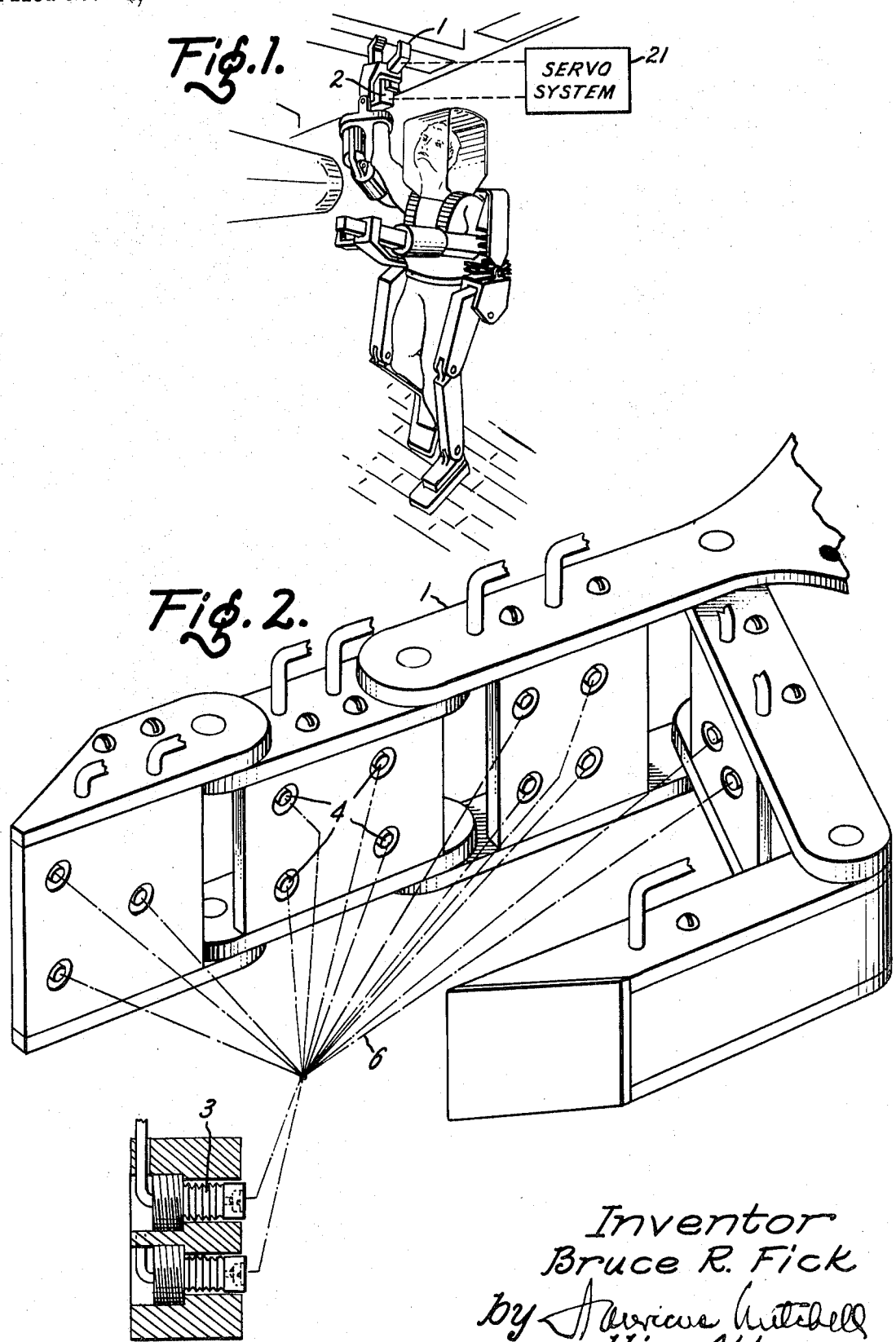

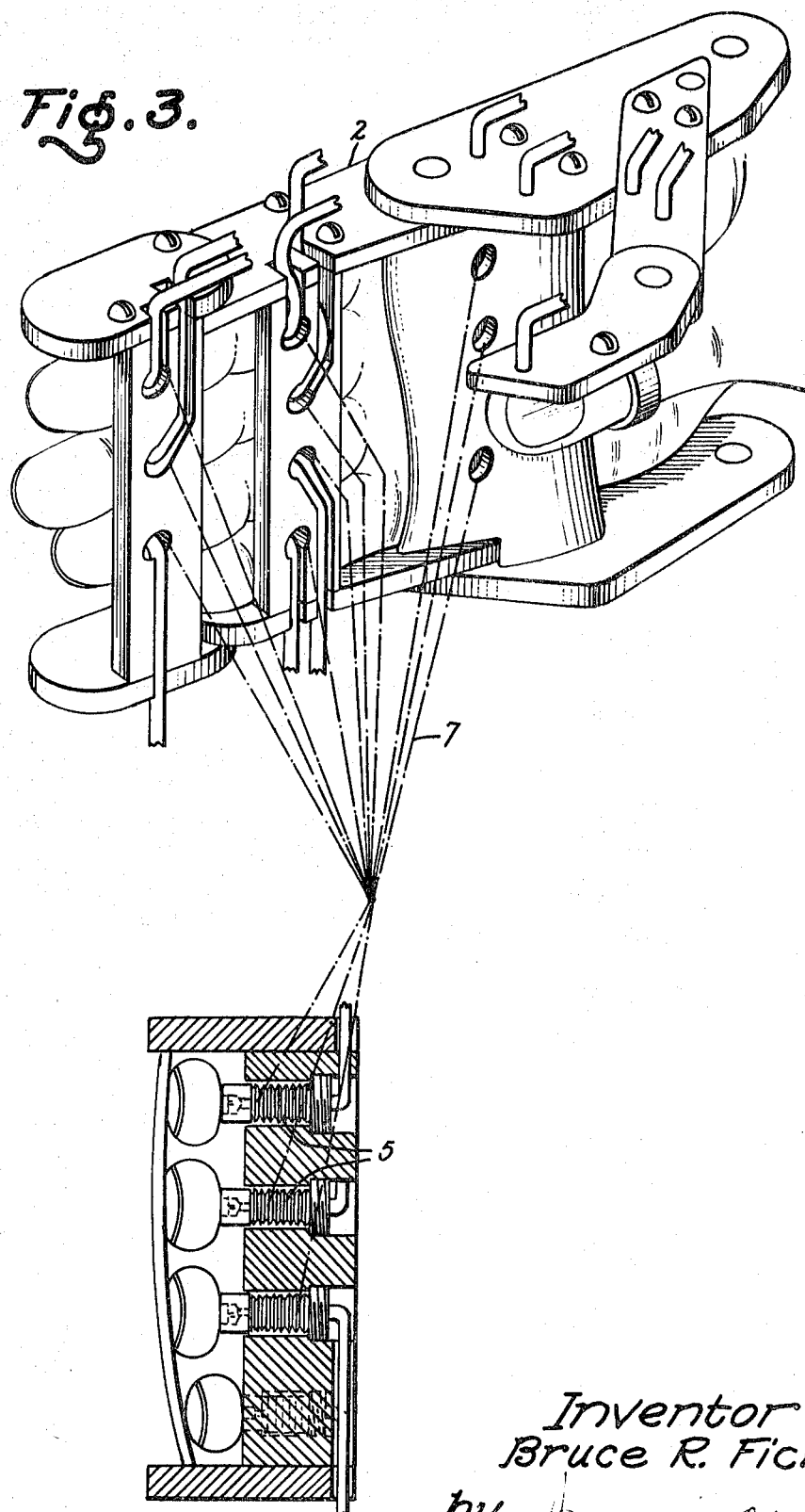

Inventor
Bruce R. Fick
by
His Attorney

United States Patent Office 3,535,711
Patented Oct. 27, 1970

3,535,711
CUTANEOUS STIMULI SENSOR AND
TRANSMISSION NETWORK
Bruce R. Fick, Ballston Lake, N.Y., assignor to General
Electric Company, a corporation of New York
Filed Nov. 1, 1967, Ser. No. 679,747
Int. Cl. A61f 1/00; B25j 3/00
U.S. Cl. 3—1.2
2 Claims

ABSTRACT OF THE DISCLOSURE

A sensory system for a cybernetic anthropomorphic machine having sensors located on the surface of the slave element and corresponding stimulators on the master controller element with connecting means for transmitting pressure applied against the sensors to the stimulators. This allows a localized sensation of touch and pressure.

---

My invention relates to a sensory system for a cybernetic anthropomorphic machine.

Previous to this invention, anthropomorphic machines have not had a sense of "feel" but have relied on visual contact with the object and machine to give the operator information as to the relative position of the machine and its surroundings.

An object of this invention is to provide a sense of localized "feel" as opposed to generalized "feel" or pressure.

Another object of this invention is to provide pressure to an operator's cutaneous sense in a specific area of the master controller which is related to the pressure applied by the slave element on a more nearly point-to-point basis rather than massive reflected pressure transmitted from the slave element at a hinge to the master controller at an homologous hinge.

Another object of my invention is to facilitate the handling of articles by a slave manipulator and to prevent crushing.

A final object of my invention is to augment the sense of balance of a human operator in a cybernetic anthropomorphic walking machine.

These and other objects of my invention will become more apparent from the following description.

In brief, my invention relates to a system for giving the operator of a cybernetic anthropomorphic machine a reflected sense of cutaneous touch or "feel." My invention has a bilateral servo system wherein sensors are located in the slave element and pressure impinging against one or more of the sensors of the slave element is transmitted to a correspondingly located stimulator of the master controller. In this way, an operator has a localized sensation of touch and pressure and can determine by his cutaneous sense just where pressure is being applied to the slave element.

The attached drawings illustrate preferred embodiments of the invention in which:

FIG. 1 shows a perspective view of a cybernetic anthropomorphic machine with its operator.

FIG. 2 shows a slave hand of the machine of FIG. 1.

FIG. 3 shows a master hand of an embodiment of FIG. 1.

Figure 4:
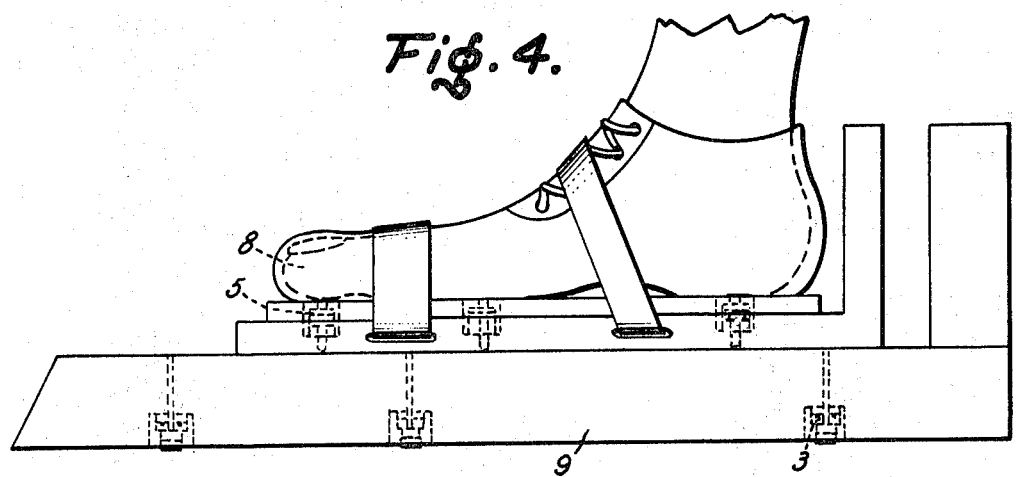
FIG. 4 shows a master foot and slave foot of a machine such as the embodiment of FIG. 1.

My sensory system is adapted to be installed in various appliances such as the cybernetic anthropomorphic machine shown in FIG. 1 or in industrial manipulators. The anthropomorphic machine surrounds the operator and is adapted for lifting and manipulating of heavy weights far in excess of the operator's strength. In the illustrated embodiment the end effector of the slave manipulator is a mechanical hand 1, which approximates the motion of a man's hand with only a few basic degrees of freedom. The slave or mechanical hand 1, shown in FIG. 2, may be used to perform rudimentary tasks such as picking up objects, elevating them or simply holding them. The control of each joint of the slave hand is effected by a master controller 2 which is kinematically similar to the slave hand.

The operator exercises direct control over spatial orientation of all joints in the master hand in that the linkages are constrained so as to move with his hand. The slave hand 1 acting through appropriate servo systems, such as shown in block 21 of FIG. 1, in turn duplicates at each of its joints an angular orientation related to each of the corresponding master joints and similarly, throughout the operation of the machine, the various joints may be actuated by master joints and bodily movement. In the case of the master hand 2, shown in FIG. 3, the operator by controlling the orientation of the master hand automatically directs the orientation of the slave hand. In some cases, the control mechanism between each of the corresponding master-slave joints is a bilateral servo system devised so that some portion of the torque generated at each of the slave joints is reproduced at each of the corresponding master joints. In this way, some sense of "feel" is given to the operator. The operator has some indication of the magnitude and direction of the force and torque that is being applied by his machine.

While servo force reflection gives the operator an indication of the gross force that the sleeve hand is applying to an article or the internal forces that are being generated between opposing digits of the slave hand, it does not give him the localized sensation of touch and pressure he would encounter were he to grasp the article in his own hand. Lacking these localized sensations, the operator cannot determine without close visual inspection, whether the forces he feels are the result of opposing digits in the slave hand closing on themselves or the result of clamping an article between them.

Greater sensitivity in the hands and feet of such a machine would be most helpful to the operator. For example, in order to provide fine motion and sensitivity, each slave hand may have located upon its working surfaces or contact surfaces a number of sensors 3, the exposed element 4 of which is constructed of a durable material such as iron and inset into the slave hand 1. As the slave hand 1 closes upon some article, the sensor elements 3 ordinarily press against parts of the article and this pressure is transmitted to the master hand 2. In the event that the article is a sandbag, for example, pressure is distributed more or less uniformly over all the sensors and this pressure is transmitted more or less uniformly to the stimulators 5 in the master control 2 and will be felt by the hand as a uniform pressure throughout. If an article of a given type, for example a heavy pipe of medium size, is grasped by the slave hand, the pipe contacts only two to five sensor elements in the slave hand. The pressure in these sensor elements is transmitted to the slave stimulator elements and gives a feeling of pressure in a limited area of the hand or pressure across a limited area of the hand depending on the way the pipe is grasped. In this way some knowledge of the weight and extent of the object is obtained.

An arrangement of sensor and stimulator hydraulic elements is seen in FIGS. 2 and 3. The stimulator elements shown in cross-section below the slave hand in FIG. 2 are set into the slave hand at the points connected by the dotted lines 6 and the sensor elements are connected to corresponding points by dotted lines 7. The operator stimulator element 5 is smaller in diameter than the slave sensor element 3. For this reason, the force exerted on a slave sensor element is transmitted in a lesser degree to the operator stimulator 5 and the operator stimulator presses against the operator with a lesser force than that which is being exerted against the slave element 1 by the article. However, the operator does have the sensation of being locally pressed by a force proportional to and less than the actual force exerted by the slave element. If the entire force is exerted by the slave element at one point on its surface and that point is a slave sensor point, a portion of this force is transmitted to the operator who then may adjust the amount of force which he is applying to the master control before damage is done to the article held by the slave element or hand.

The operation of my system when applied to the foot is very similar to that described above in reference to the hand.

A problem of cybernetic anthropomorphic walking machines is that while the man himself feels balanced as to his own feet, the machine on which he is standing may be ready to topple over. Stimulators 5 of my invention provided on the bottom of each of the operator's feet 8 and connected to sensors 3 on the corresponding foot 9 of the walking machine give him information as to the distribution of pressure on the bottom of the slave feet and as to the state of equilibrium of the machine. In some situations, the operator's sensation of balance derived from his kinesthetic senses and his semicircular canals may not be enough to give him a sense of fine balance. Also, the terrain over which the anthropomorphic machine may walk is not always flat and allowance must be made for sharp ridges. If the machine and operator are submerged, as for example, a suited diver who is lowered to the ocean floor, then the operator or diver may not always be able to see the bottom to determine its nature or to establish a horizon to aid in balance. Further, an operator who is submerged in a liquid may not have sufficient tactile sensation through the soles of his feet since his body density approximates that of water. The weight of the metal frame of the machine plus that of the operator may bear with considerable force against the bottom of the body of water and the amount and direction of this force is imparted to the sensors underneath the machine's feet and a part of his force is transmitted to the stimulators bearing against the operator's feet. The submerged operator has the advantage for balance of tactile foot sensations corresponding to pressure exerted by the slave foot against the bottom. For these and other reasons, the location of the sensor-stimulator system upon the feet of the machine and man is desirable. Three or more sensors may be located upon the bottom of the machine and three or more corresponding stimulators located adjacent the operator's foot as shown in FIG. 4. In this way, the operator has a valuable adjunct to his other senses to aid him in determining whether the weight of the machine is resting on a forward part, a medial or an aft part of the slave foot.

It is readily seen that other applications for the cutaneous stimuli sensor and transmission network may exist such as a means for transmitting cutaneous stimuli from the surface of a hard space suit hand or foot to the hand or foot of the astronaut within. Sensors on the outer surface of the hard suit are connected through transmission lines to stimulators mounted inside of rings on the astronaut's hands. Thus resistance encountered by the space suit exterior is transmitted to the cutaneous senses of the astronaut.

Figure 5:
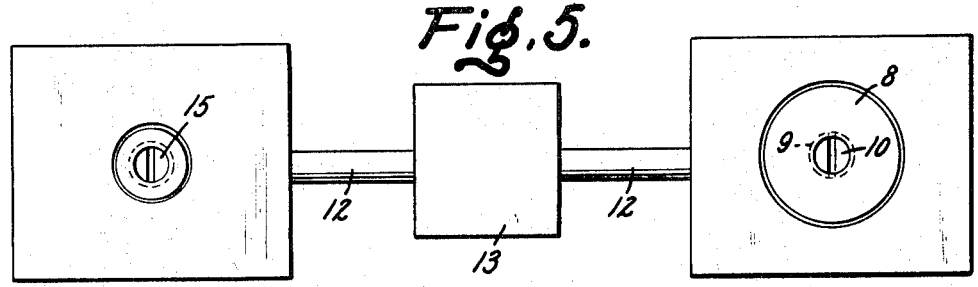
FIG. 5 shows a sensor transmitter and stimulator in the system of the cybernetic anthropomorphic machine of FIG. 1.
Figure 6:
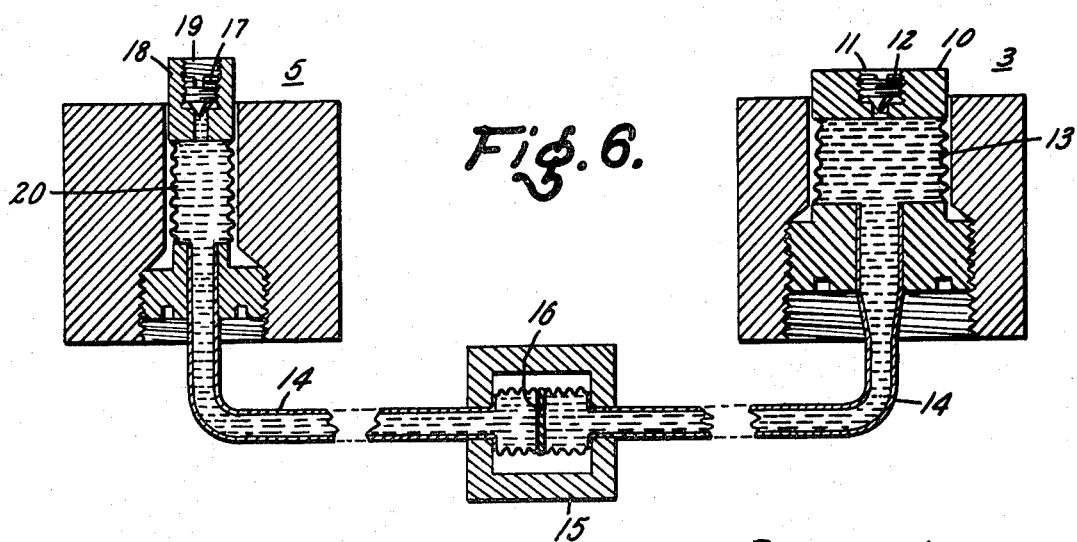
FIG. 6 shows a side cutaway view of the sensor, transmitter and stimulator of FIG. 5.

FIGS. 5 and 6 show an embodiment of the transmission system of applicant's invention. In this embodiment applicant uses a transmission fluid to pass the pressure from one point to another. The slave sensor 3 shown here has a contact element 10 having a surface with a bleed port 11 located in its center. A set screw 12 is threaded into the port to allow bleed through the port when it is removed, if so desired. A sensor bellows 13 is underneath the contact element 10 and mounted on the bottom of the bellows is a conduit 14 made of heavy rubber or some material which has a wall of such thickness and tensile strength that it is substantially non-expansible.

In the conduit 14 between the operator stimulator and the slave sensor may be located an isolation or limit structure 15 having as its principal operable element a movable partition 16. This structure functions so that rupture of one end of the system does not empty the other end of the system. Further, if a large pressure is applied to the slave sensor this pressure is transmitted to the operator stimulator but no greater pressure is transmitted after the isolation partition 16 has gone the full transverse of its path. Thus, the operator may be stimulated or overstimulated to the point of pain without being seriously damaged when quite large pressures are applied to the corresponding slave element. Also, in a nuclear environment fluid in one half of the system may become contaminated and would have to be isolated from fluid in proximity to the operator. The isolation structure may provide a thermal insulating barrier for high or low temperature applications. Any of various materials such as Bakelite, Micarta or heavy rubber may be used as the movable partition 16 for thermal or electrical insulation. If the limiter is to be used to isolate radioactive transmission fluid from another fluid where radioactivity is not desired then a dense non-radioactive material such as lead is used as the partition of the limiter.

A set screw 17 is mounted centrally in the master stimulator contact element 18 in the same way as in the sensor. The set screw is inset into this surface to give easier accessibility and to heighten the apparent cutaneous sensitivity of the operator to variations in the pressure of the stimulator. Cutaneous sensitivity depends on skin pressure gadient or bending of the skin. The inner rim 19 of the stimulator brings about a second skin pressure gradient which heightens apparent skin sensitivity, particularly at low pressures where cutaneous sensitivity is small. The bellows 20 under the contact element 18 is connected to the side of the limit structure remote from the slave sensor.

While this embodiment shows a hydraulic system it is readily appreciated that the system may be hydraulic, electrical or mechanical in nature.

The present invention shows an apparatus which has the advantage of avoiding damage to itself or to objects held by it and is capable of fine control. When applied to the operator's foot the apparatus gives the operator a heightened sense of balance.

The apparatus also has the advantage that it provides a feedback force proportional to the force being applied by a slave instrumentality in those systems where there is no bilateral servo system.

The fluid in the system may be used to conduct heat to give corresponding sensations to the operator and may also dampen high frequency vibrations of the object being touched by the slave sensor to give a feeling of steady state pressure at the stimulator end of the system.

A final advantage is that emergency reactions of the operator to feedback stimulations are those needed to solve the machine's problems.

The foregoing is a description of an illustrative embodiment of the invention, and it is applicant's intention in the appended claims to cover all forms which fall within the scope of the invention.

What I claim as new and desire to secure by Letters Patent of the United States is:

1. In combination,
   a slave element having a surface adapted for applying force to an object,
   a master element having a surface adapted to be in contact with a limb of an operator whereby the movement of said master element is controlled by the movement of said limb, means responsive to movement of said master element for producing a corresponding movement in said slave element, a plurality of sensors located on said surface of said slave element for sensing the force applied by said surface of said slave element to said object, a plurality of stimulators, each situated on said surface of said master element in a location similar to the situation of a respective sensor on said surface of said slave element, a plurality of conduits for fluid, each interconnecting a respective sensor and a similarly situated stimulator, each of said sensors including a plate member forming a part of a respective conduit and moveable in response to force applied thereto to produce displacement of fluid in said respective conduit, and each of said stimulators including another plate member forming another part of said respective conduit movable in response to the displacement of fluid in said respective conduit, an isolation wall located in said respective conduit to form therein a pair of containers for said fluid, one container including said one plate member and the other container including said other plate member, said isolation wall being moveable in said containers in response to a displacement of fluid in one of said containers, whereby the limb of said operator receives localized sensations of applied force.

2. In combination, a slave element having a surface adapted for applying force to an object, a master element having a surface adapted to be in contact with a limb of an operator whereby the movement of said master element is controlled by the movement of said limb, means responsive to movement of said master element for producing a corresponding movement in said slave element, a plurality of sensors located on said surface of said slave element for sensing the force applied by said surface of said slave element to said object, a plurality of stimulators, each situated on said surface of said master element in a location similar to the situation of a respective sensor on said surface of said slave element, a plurality of conduits for fluid, each interconnecting a respective sensor and a similarly situated stimulator, each of said sensors including a plate member forming a part of a respective conduit and moveable in response to force applied thereto to produce displacement of fluid in said respective conduit, and each of said stimulators including another plate member forming another part of said respective conduit moveable in response to displacement of fluid in said respective conduit, said respective conduit including a section in the form of a bellows, the ends of said section being maintained in fixed spatial relationship, a solid wall located inside said bellows and spaced between the ends thereof to seal one side of the section from the other.

References Cited

UNITED STATES PATENTS

| | | | |
|---|---|---|---|
| 2,582,234 | 1/1952 | Conzelman et al. | 3—1.2 X |
| 2,846,084 | 8/1958 | Goertz et al. | 214—1 |
| 3,168,203 | 2/1965 | Gallistel | 214—1 |
| 3,241,687 | 3/1966 | Orloff | 214—1 |
| 3,263,824 | 8/1966 | Jones et al. | 214—1 |
| 3,310,182 | 3/1967 | Orloff | 214—1 |
| 3,358,678 | 12/1967 | Kultsar | 3—1.2 X |

FOREIGN PATENTS

| | | |
|---|---|---|
| 166,099 | 11/1964 | U.S.S.R. |

RICHARD A. GAUDET, Primary Examiner

K. L. HOWELL, Assistant Examiner

U.S. Cl. X.R.

214—1